May 24, 1927.  1,629,755
G. W. WILMOT ET AL
DRIVE CHAIN
Filed Dec. 11, 1923
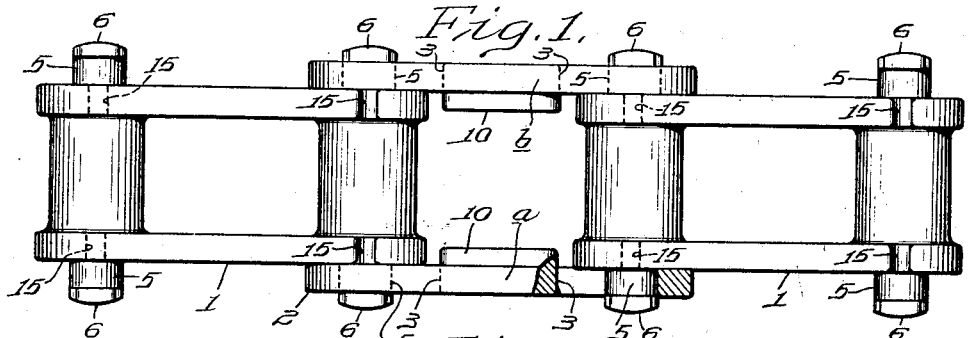
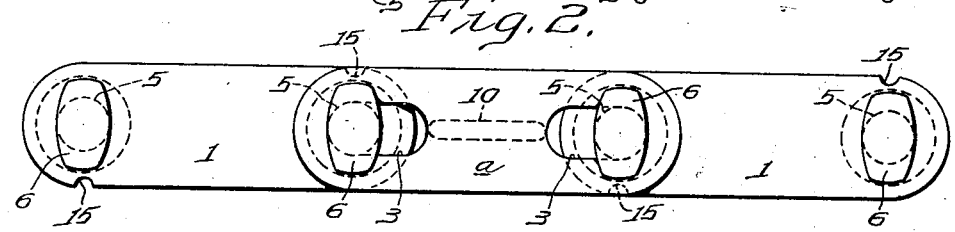
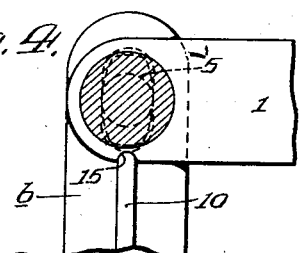
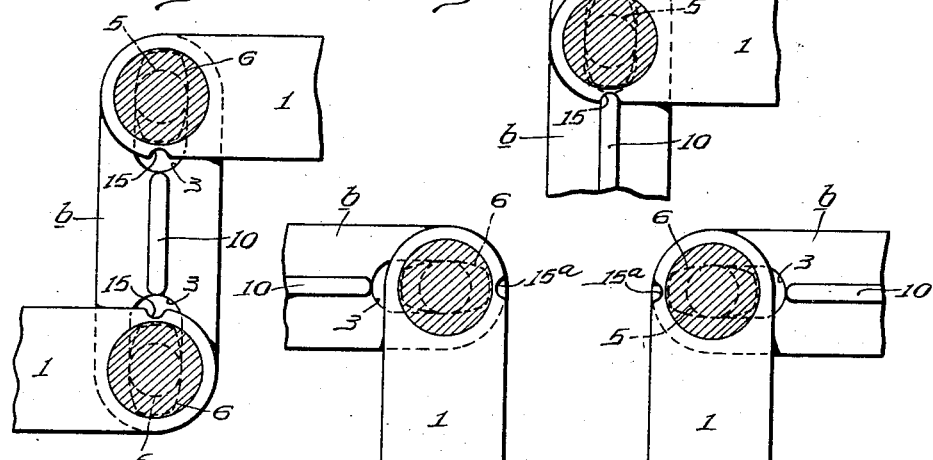
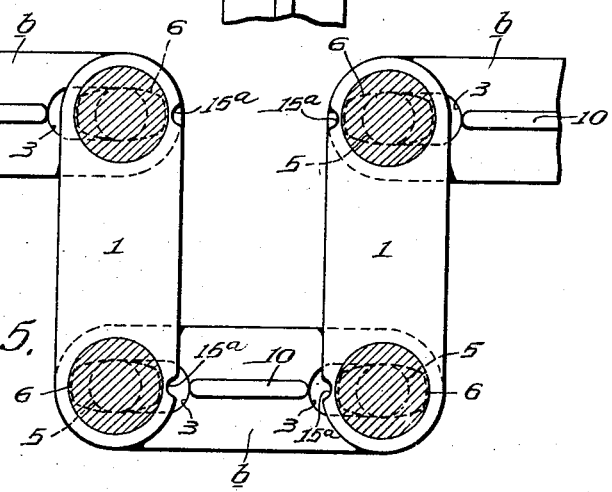
WITNESS
F. J. Hartman
INVENTORS
George W. Wilmot
Francis H. Blatch
BY Anderson Moulton
ATTORNEYS Patented May 24, 1927.

1,629,755

UNITED STATES PATENT OFFICE.

GEORGE W. WILMOT AND FRANCIS H. BLATCH, OF HAZLETON, PENNSYLVANIA, ASSIGNORS TO WILMOT ENGINEERING COMPANY, OF HAZLETON, PENNSYLVANIA, A CORPORATION OF PENNSYLVANIA.

DRIVE CHAIN.

Application filed December 11, 1923. Serial No. 679,896.

Our invention relates to drive-chains and it has for its general object to provide novel means for preventing accidental separation or disconnection of the links of the chain when the same is in use and for facilitating the connecting and the disconnecting or disjointing of the links when desired.

A further object of the invention is to provide a chain of novel construction such that a minimum amount of shortening or collapsing is necessary in order to effect connection or disconnection of adjacent links.

To these and other ends the invention comprehends the construction as hereinafter set forth in detail, particularly pointed out in the claims, and as illustrated in the accompanying drawing in which we have illustrated certain convenient forms of embodiment thereof. However, it will be understood that the invention is susceptible of embodiment in other forms of construction than those shown and that changes may be made in the details of construction within the scope of the claims without disjointing from the said invention.

In the drawing,

Fig. 1 is a view partially in top plan and partially in horizontal section of a portion of drive-chains embodying the invention;

Fig. 2 is a view in side elevation thereof;

Fig. 3 is a view in central longitudinal vertical section of a portion of chain, one of the links thereof being arranged in transverse relation to the overlapping ends of two adjacent links;

Fig. 4 is a view in central vertical section of the upper portion of the chain structure shown in Fig. 3 showing the upper horizontally arranged link in lowered position; and Fig. 5 is a view in central longitudinal vertical section of a portion of chain showing a slightly modified construction, certain of the chain links being in position to permit relative adjustment thereof for the purpose of connecting or disconnecting said links.

Referring to the drawing: 1 and 2 designate the links of a chain alternately arranged with respect to each other. The former links in the construction shown consist of solid members while the latter consist of oppositely disposed side bars $a$ and $b$, the opposite ends of which overlap the adjacent ends of links 1.

The side bars $a$ and $b$ of the links 2 are provided respectively with slots or openings 3 near their opposite ends which slots are adapted to engage trunnions or pintles 5 upon the opposite sides and adjacent the opposite ends of the links 1. These trunnions or pintles 5 are each provided with elongated heads 6 which extend transversely of the links 1 to which they are connected and likewise transversely of the length of the chain when the latter is in extended position, at which time they likewise extend transversely of the said slots.

For the purpose of engaging or disengaging the slots 3 with the trunnions 5, it is necessary that the adjacent links 1 and 2 be arranged in such relative position that the elongated heads 6 are in parallel relation to the said slots. When in this position the heads 6 together with the trunnions 5 may be inserted through the said slots after which the links may be turned from the position shown in Figs. 3 and 4 to that shown in Figs. 1 and 2.

For the purpose of preventing collapsing of the links when the chain is in use and in order to reduce to a minimum the possibility of accidental separation of the links, we have provided inwardly extending ribs 10 upon the inner sides of the bars $a$ and $b$ of the alternate links 2. The opposite ends of these ribs terminate adjacent the inner ends of the slots 3 as is clearly shown.

Referring now to Figs. 1 to 4, inclusive, of the drawing, 15 designates notches arranged in couples adjacent the opposite ends of the links 1, one couple being upon the top and the other upon the bottom side thereof. The purpose of these notches is to permit the links 1, connected to the opposite ends of the bars $a$ and $b$ of any link 2, to be moved toward each other so as to cause the notches 15 adjacent the ends of the said links 1 to engage the opposite ends of the inwardly extending ribs 10 upon the side bars $a$ and $b$ of an intermediate link 2. When thus adjusted, as is shown in Fig. 4, the heads 6 are in alignment with the slots 3 so that the said side bars $a$ and $b$ may be removed by sliding the same outwardly over the said heads 6.

The length of the heads 6 and the relation of the opposite ends thereof to the edges of the sides of the links 1 are such that but for the presence of the notches 15 the said links 1 could not be moved toward each other, when the side bars $a$ and $b$ of a link are arranged in transverse relation to two links 1, as shown in Fig. 3, a sufficient distance to bring the said heads into alignment with the slots 3.

In the construction, as shown in Figs. 1 to 4, inclusive, in which the notches 15 are provided alternately upon the tops and the bottoms of the links 1 adjacent the opposite ends thereof in the opposite side edges thereof, it is only necessary, in order to disconnect or to connect links from or to each other, to shorten the said chain by the amount of the length of a single link. It is apparent that a construction which is of a character to permit the disconnection of the links merely by the shortening of the chain to the extent of a single link or pitch length is an advantage of practical importance.

In the construction, as shown in Fig. 5 of the drawing, the notches $15^a$ in the links 1 at the opposite ends of said links are located on the same side of the chain, that is, both couples of notches are located either on the top or on the bottom side of the links 1. When the notches $15^a$ are thus arranged, it becomes necessary, in order to remove the side bars $a$ and $b$ of a link, to arrange two links 1 connected with the opposite ends of the side bars of a link 2 in transverse relation such bars which links extend in the same direction from the said bars. When in such position it is apparent that the lower ends of the links 1 which are depending, as shown in Fig. 5, may be moved toward each other so as to carry the notches $15^a$ into engagement with the ribs 10 upon the inner side bars $a$ and $b$ of a link 2. When in such position the heads 6 are in parallel relation to and are in alignment with the openings 3 in the said side bars $a$ and $b$ so that the latter may be readily removed by sliding the same outwardly over the said heads 6. By a reverse movement the side bars $a$ and $b$ may be placed in engagement with the trunnions or pintles 5 after which the links may be extended and straightened out into alignment with each other as shown in Figs. 1 and 2 of the drawing.

Although the latter construction, as shown in Fig. 5, has some advantages over previously known chain constructions of the character and type to which this construction belongs, we prefer the form of construction shown in Figs. 1 and 4 because in the latter it is only necessary to shorten the chain by a single link or pitch length in order to connect or disconnect chain links from each other, while in the former it is necessary to shorten the chain to the extent of two links or pitch lengths.

It will be seen that by our invention we have provided a chain structure which is simple in construction and which embodies novel features of a character such that the chain links may be readily connected with or disconnected from each other, and having been once connected are not liable to become accidentally disconnected or separated from each other.

Having thus described our invention, what we claim and desire to secure by Letters Patent is:

1. In a drive-chain, the combination of links respectively comprising side bars each of which bars is provided with inwardly extending ribs and each of which is also provided with slots adjacent its opposite ends, the inner ends of which terminate adjacent the opposite ends of the said ribs, alternate links having notches in their sides and adjacent their ends, with which the opposite ends of the said ribs are adapted to engage when the said side bars of any link are arranged in transverse relation to adjacent alternate links when the latter are moved inwardly toward each other, and pintles for pivotally connecting the said links together.

2. In a drive-chain, the combination of links respectively consisting of oppositely disposed side bars each of which bars is provided with a rib centrally situated upon its inner side and with slots adjacent its opposite ends, the inner ends of which terminate adjacent the opposite ends of said ribs, and links alternating with the first named links, the second named links being provided with one or more notches adjacent one end thereof upon one side and with one or more notches adjacent its opposite end upon its other side, which notches are adapted to be engaged by the said ribs when the said side bars of the first named links are arranged substantially at right angles to adjacent alternate links when the latter are moved inwardly of the said bars.

3. In a drive-chain, the combination of links which respectively consist of oppositely disposed spaced bars having stop projections upon their inner sides and also which have slots adjacent their opposite ends which slots extend longitudinally thereof, links which alternate with the first named links, the said second named links each being provided with head portions which are situated intermediate the side bars of the alternating first named links, the said second named links being provided respectively with notches adjacent their opposite ends, the said notches occurring alternately upon the tops and bottoms of the said links.

4. In a drive-chain, the combination of links which respectively consists of side bars spaced from each other, which bars are provided with stop projections upon their inner sides and also with slots adjacent their opposite ends, links which alternate with the first named links, the said second named links being provided respectively with notches adjacent their opposite ends, the said notches being arranged in couples and alternately upon the tops and bottoms of said links, and pintles pivotally connecting the said links together, the outer ends of said pintles being provided with heads which are adapted to be inserted and withdrawn through said slots substantially as described.

5. In a drive-chain, the combination of links respectively consisting of side bars arranged in spaced relation to each other which side bars are provided with stop projections on their inner sides and slots adjacent their opposite ends, the inner ends of which terminate adjacent said stop projections, links which alternate with the first named links and the ends of which are overlapped by the ends of the first named links, the said second named links having notches adjacent their opposite ends which notches are arranged alternately upon the tops and bottoms of said links, and pintles for engaging said slots which pintles are provided with heads for retaining the said side bars in place.

In testimony that we claim the foregoing as our invention, we have hereunto signed our names this 6th day of December, A. D., 1923.

GEORGE W. WILMOT.
FRANCIS H. BLATCH.